United States Patent
Nitadori et al.

(10) Patent No.: US 11,286,339 B2
(45) Date of Patent: Mar. 29, 2022

(54) CYCLOPENTENE RING-OPENING COPOLYMER AND METHOD OF PRODUCING THE SAME

(71) Applicant: ZEON CORPORATION, Tokyo (JP)

(72) Inventors: Hiroyuki Nitadori, Tokyo (JP); Shingo Okuno, Tokyo (JP); Yasuo Tsunogae, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 207 days.

(21) Appl. No.: 16/487,011

(22) PCT Filed: Mar. 16, 2018

(86) PCT No.: PCT/JP2018/010569
§ 371 (c)(1),
(2) Date: Aug. 19, 2019

(87) PCT Pub. No.: WO2018/173968
PCT Pub. Date: Sep. 27, 2018

(65) Prior Publication Data
US 2020/0231744 A1    Jul. 23, 2020

(30) Foreign Application Priority Data
Mar. 24, 2017    (JP) .............................. JP2017-059937

(51) Int. Cl.
*C08G 61/08* (2006.01)
*C08L 9/06* (2006.01)
*B60C 1/00* (2006.01)

(52) U.S. Cl.
CPC ................ *C08G 61/08* (2013.01); *B60C 1/00* (2013.01); *C08L 9/06* (2013.01)

(58) Field of Classification Search
CPC .............. C08G 61/08; C08L 9/06; B60C 1/00
USPC ....................................................... 524/518
See application file for complete search history.

(56) References Cited

U.S. PATENT DOCUMENTS

| | | | |
|---|---|---|---|
| 3,681,300 A | 8/1972 | Uraneck et al. | |
| 3,707,520 A * | 12/1972 | Pampus | C08G 61/08 524/553 |
| 3,781,257 A | 12/1973 | Pampus et al. | |
| 10,435,497 B2 | 10/2019 | Tsunogae et al. | |
| 2012/0296035 A1 * | 11/2012 | Tsunogae | C08G 61/08 524/576 |
| 2016/0002382 A1 * | 1/2016 | Tsunogae | C08K 3/04 524/547 |
| 2017/0129990 A1 | 5/2017 | Tsunogae et al. | |
| 2017/0253695 A1 | 9/2017 | Tsunogae et al. | |

FOREIGN PATENT DOCUMENTS

| | | |
|---|---|---|
| CN | 103224578 A | 7/2013 |
| CN | 105073823 A | 11/2015 |
| EP | 3 689 938 A1 | 8/2020 |
| JP | S48-026399 A | 4/1973 |
| JP | S50-021000 A | 3/1975 |
| JP | S53-024400 A | 3/1978 |
| JP | S57-076015 A | 5/1982 |
| JP | 2011-126966 A | 6/2011 |
| WO | 2011/087072 A1 | 7/2011 |
| WO | 2014/133028 A1 | 9/2014 |
| WO | 2015/194637 A1 | 12/2015 |
| WO | 2016/031847 A1 | 3/2016 |
| WO | 2016/158676 A1 | 10/2016 |

OTHER PUBLICATIONS

Jun. 9, 2021 Office Action issued in Chinese Patent Application No. 201880012937.7.
Jun. 1, 2021 Office Action issued in Japanese Patent Application No. 2019-507640.
Oct. 20, 2021 Office Action issued in Chinese Patent Application No. 201880012937.7.

* cited by examiner

*Primary Examiner* — Kelechi C Egwim
(74) *Attorney, Agent, or Firm* — Oliff PLC

(57) ABSTRACT

A cyclopentene ring-opening copolymer having a branch structure contains a structure in which at least four cyclopentene ring-opening polymer chains are linked via a branch-structural unit. At least part of the cyclopentene ring-opening polymer chains is terminally modified.

4 Claims, 3 Drawing Sheets

CYCLOPENTENE RING-OPENING COPOLYMER AND METHOD OF PRODUCING THE SAME

TECHNICAL FIELD

The present invention relates to a cyclopentene ring-opening copolymer and a method of producing the same.

BACKGROUND ART

Cyclopentene ring-opening polymers have been known as one of the synthetic rubbers being investigated as a substitute material for butadiene rubber. A cyclopentene ring-opening polymer is obtained by applying ring-opening metathesis polymerization to cyclopentene, as a straight-chain rubber polymer having no branch in the main chain. Also, it is possible to modify the terminals of the main chain by adding a terminal modifier as a chain transfer agent during polymerization. Therefore, a cyclopentene ring-opening polymer can provide a crosslinked rubber excellent in low heat buildup (low fuel consumption) and in wet grip performance.

On the other hand, since a cyclopentene ring-opening polymer does not have a branch in the main chain, it is recognized to have mutual adherence in a high-temperature environment, namely, to be inferior in hot flowability, and thereby, there is a problem of inferior productivity. Therefore, studies have been conventionally made to improve the hot flowability of a cyclopentene ring-opening polymer. For example, Japanese Laid-Open Patent Application No. 2011-126966 (Patent Document 1) discloses a technique for obtaining a cyclopentene ring-opening copolymer having improved hot flowability by copolymerizing cyclopentene and a compound having a vinyl group.

RELATED ART DOCUMENTS

Patent Document

Patent Document 1: Japanese Laid-Open Patent Application No. 2011-126966

SUMMARY OF INVENTION

Problem to be Solved by the Invention

However, in such a conventional cyclopentene ring-opening copolymer, although the hot flowability of the copolymer is improved, a portion corresponding to a vinyl group introduced as a long chain branch is not terminally modified; therefore, low heat buildup may not be obtained sufficiently enough as a crosslinked rubber. Therefore, it has been desired for a rubber polymer having improved hot flowability without reducing the low heat buildup as a crosslinked rubber.

An object of the present invention is to provide a cyclopentene ring-opening copolymer excellent in hot flowability while maintaining the low heat buildup of a crosslinked rubber.

Means for Solving the Problem

In order to solve the above problems, according to an aspect of the present invention, a cyclopentene ring-opening copolymer having a branch structure contains a structure in which at least four cyclopentene ring-opening polymer chains are linked via a branch-structural unit; and at least part of the cyclopentene ring-opening polymer chains is terminally modified.

Advantageous Effect of the Present Invention

According to an aspect of the present invention, it is possible to obtain a cyclopentene ring-opening copolymer excellent in hot flowability while maintaining the low heat buildup of a crosslinked rubber.

EMBODIMENTS FOR CARRYING OUT THE INVENTION

Figure 1:
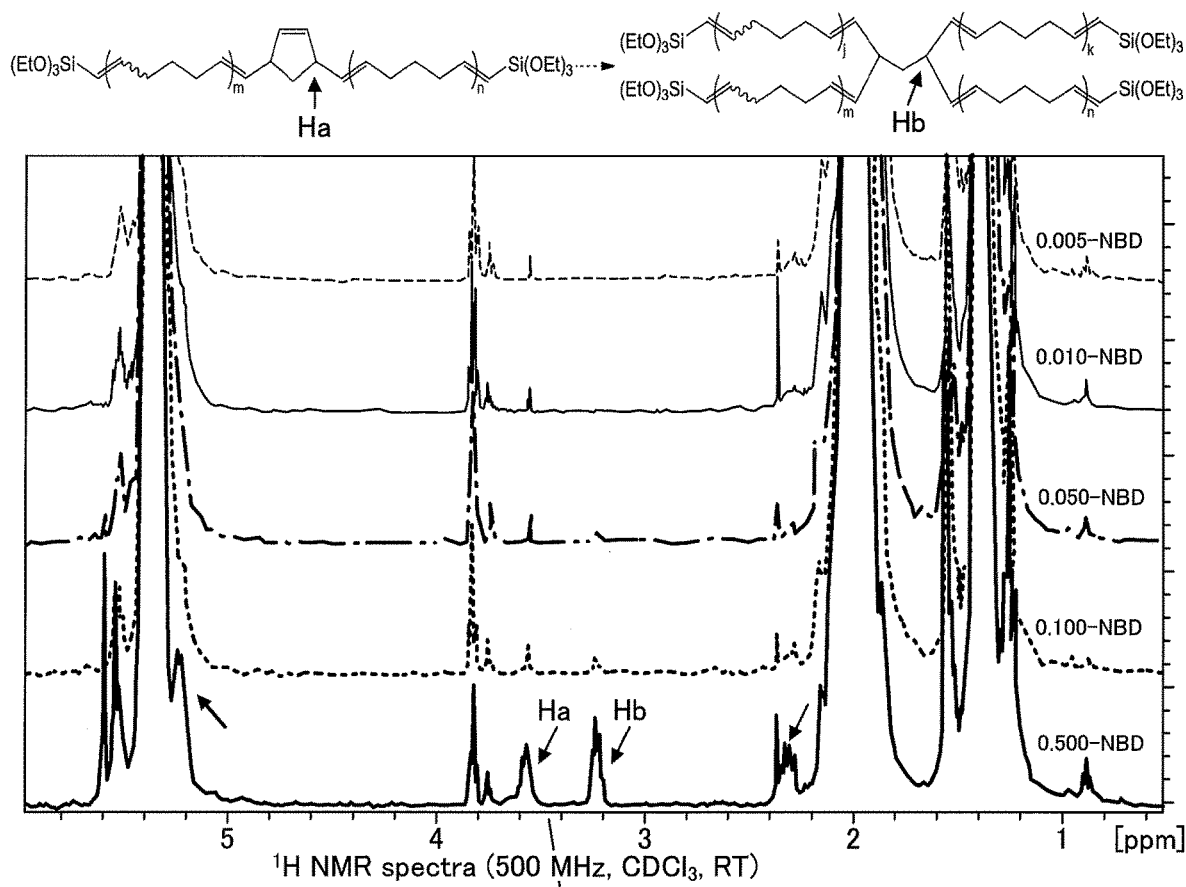
FIG. 1 is a diagram illustrating a nuclear magnetic resonance (NMR) spectrum of a cyclopentene ring-opening copolymer according to an embodiment of the present invention.
Figure 1:
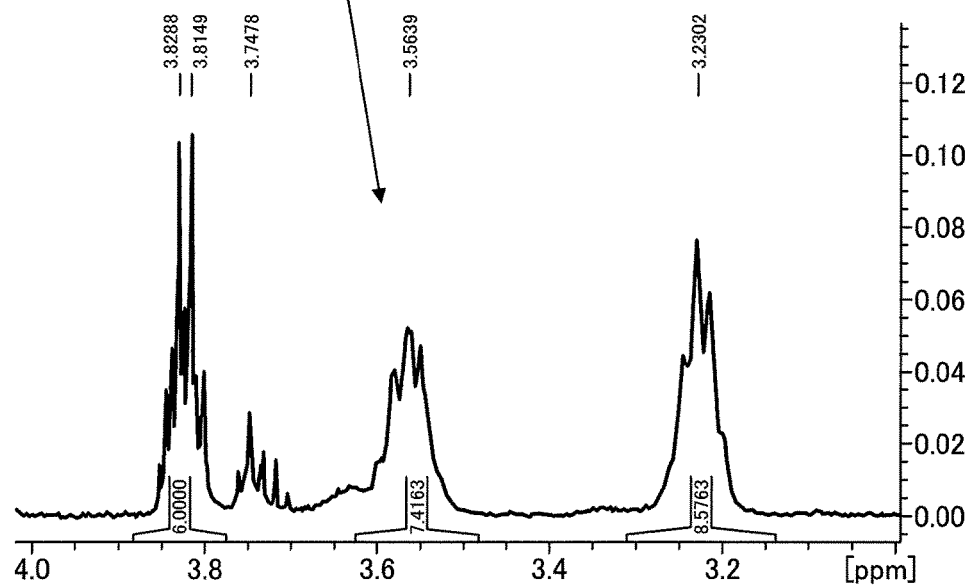

In the following, embodiments of the present invention will be described in detail.

<Cyclopentene Ring-Opening Copolymer>

A cyclopentene ring-opening copolymer according to the present embodiment is a cyclopentene ring-opening copolymer having a branch structure, and includes a structure in which at least four cyclopentene ring-opening polymer chains are linked via a branch-structural unit, and at least part of the cyclopentene ring-opening polymer chains is terminally modified.

A cyclopentene ring-opening copolymer is a copolymer that contains a repeating unit (referred to as a cyclopentene-derived structural unit, below), formed by applying ring-opening polymerization to cyclopentene, that constitutes the main chain of the cyclopentene ring-opening copolymer.

In a cyclopentene ring-opening copolymer of the present embodiment, the ratio of cyclopentene-derived structural units with respect to all repeating units is favorably greater than or equal to 86 mol %, more favorably greater than or equal to 92 mol %, even more favorably greater than or equal to 96.4 mol %. Further, with respect to all the repeating units, it is favorably less than or equal to 99.99 mol %, more favorably less than or equal to 99.95 mol %, and even more favorably less than or equal to 99.90 mol %.

At least part of cyclopentene ring-opening polymer chains constituting a cyclopentene ring-opening polymer is terminally modified. Here, "a cyclopentene ring-opening polymer chains being terminally modified" means that a terminal of a cyclopentene ring-opening polymer chain is modified by a modifying group. As such a modifying group, although not limited in particular, a modifying group that contains an atom selected from among a group consisting of a nitrogen atom, an oxygen atom, a silicon atom, a phosphorus atom, and a sulfur atom, is favorable. Among these, a modifying group containing an atom selected from among a group consisting of a nitrogen atom, an oxygen atom, and a silicon atom is more favorable, and a modifying group containing a silicon atom is even more favorable.

As a modifying group containing a nitrogen atom, an amino group, pyridyl group, imino group, amido group, nitro group, urethane bonding group, or hydrocarbon group containing these groups may be exemplified.

As a modifying group containing an oxygen atom, a hydroxyl group, carboxyl group, ether group, ester group, carbonyl group, aldehyde group, epoxy group, or hydrocarbon group containing these groups may be exemplified.

As a modifying group containing a silicon atom, an alkylsilyl group, oxysilyl group, or hydrocarbon group containing these groups may be exemplified.

As a modifying group containing a phosphorus atom, a phosphate group, phosphino group, or hydrocarbon group containing these groups may be exemplified.

As a modifying group containing a sulfur atom, a sulfonyl group, thiol group, thioether group, or hydrocarbon group containing these groups may be exemplified.

Further, the modifying group may be a modifying group that contains multiple groups described above. Among these, from the viewpoint of capability to further improve the low heat buildup of a crosslinked rubber obtained by crosslinking a rubber composition, an amino group, pyridyl group, imino group, amido group, hydroxyl group, carboxyl group, aldehyde group, epoxy group, oxysilyl group, or hydrocarbon group containing these groups is favorable; and an oxysilyl group is particularly favorable. Note that an oxysilyl group is a group having a silicon-oxygen bond.

As specific examples of an oxysilyl group, an alkoxysilyl group, aryloxysilyl group, acyloxysilyl group, alkylsiloxysilyl group, arylsiloxysilyl group, or hydroxysilyl group may be listed. Among these, from the viewpoint of having high effect when introduced into a cyclopentene ring-opening polymer chain, an alkoxysilyl group is favorable.

An alkoxysilyl group is a group formed by bonding one or more alkoxy groups to a silicon atom. As specific examples of an alkoxysilyl group, a trimethoxysilyl group, (dimethoxy) (methyl)silyl group, (methoxy) (dimethyl)silyl group, triethoxysilyl group, (diethoxy) (methyl)silyl group, (ethoxy) (dimethyl)silyl group, (dimethoxy) (ethoxy)silyl group, (methoxy) (diethoxy)silyl group, tripropoxy silyl group, tributoxy silyl group, or the like may be listed.

The introduction rate of modifying groups that modify at least part of cyclopentene ring-opening polymer chains is, although not limited in particular, in terms of the percentage value of (the number of terminals of cyclopentene ring-opening polymer chains into which modifying groups are introduced)/(the total number of terminals of the cyclopentene ring-opening polymer chains), favorably greater than or equal to 80%, more favorably greater than or equal to 85%, and even more favorably greater than or equal to 90%. The introduction rate of modifying groups falling in the above range enables to further improve the low heat buildup of a crosslinked rubber to be obtained.

Note that a method of measuring the introduction rate of modifying groups into terminals of polymer chains is not limited in particular; for example, it can be obtained from the peak surface ratio corresponding to the modifying groups obtained from $^1$H-NMR spectrometry and the number average molecular weight obtained from gel-permeation chromatography.

A cyclopentene ring-opening copolymer of the present embodiment contains a structure in which at least four cyclopentene ring-opening polymer chains are linked via a branch-structural unit, and thereby, is excellent in hot flowability. Also, a cyclopentene ring-opening copolymer of the present embodiment has at least part of the cyclopentene ring-opening polymer chains terminally modified; therefore, the affinity with a filler or the like is good, and the low heat buildup of a crosslinked rubber to be obtained can be improved.

In the present embodiment, it is favorable that a branch-structural unit is constituted with a structural unit derived from a polycyclic olefin compound having at least two ring structures each having one double bond (may be abbreviated as a "polycyclic olefin compound", below). This structural unit derived from a polycyclic olefin compound is a structural unit formed by applying ring-opening copolymerization to cyclopentene with a polycyclic olefin compound having at least two ring structures each having one double bond.

A polycyclic olefin compound as such is not limited in particular as long as it is a compound containing a structure having at least two ring structures each having one double bond in one molecule; for example, compounds expressed by the following general formula (1) and compounds expressed by the upper row of (D) to (H) in the following formula (2) may be listed. Among these, compounds expressed by the following general formula (1) are favorable as being easier to control the copolymerization ratio when carrying out polymerization. Further, among the compounds expressed by the following general formula (1), compounds expressed by the upper row of (A) to (C) in the following formula (2) are more favorable, and norbornadiene shown in the upper row of (A) in the following formula (2) is particularly favorable. Note that each of the compounds in the following general formula (1) and in the upper row of (A) to (H) in the following formula (2) may have any substituent. One of these polycyclic olefin compounds may be used singly or two or more may be used in combination with any ratios.

(1)

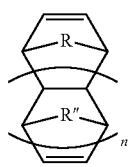

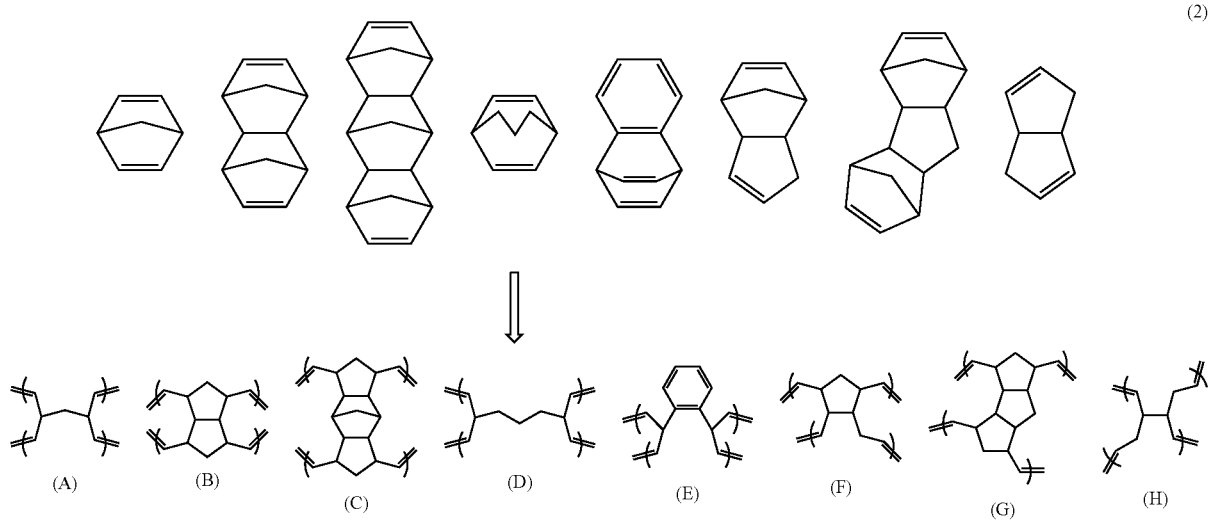

(2)

(A) (B) (C) (D) (E) (F) (G) (H)

By carrying out ring-opening copolymerization for a compound expressed by the above general formula (1) as a polycyclic olefin compound described above with cyclopentene, a structural unit expressed by the following general formula (3) can be obtained. For example, the compounds expressed in the upper row of (A) to (C) in the above formula (2) as specific examples of the compound expressed by the above general formula (1) can provide structural units expressed in the lower rows of (A) to (C) in the above formula (2).

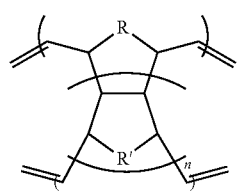

(3)

Also, the compounds expressed in the upper row of (D) to (H) in the above formula (2) can provide structural units expressed in the lower rows of (D) to (H) in the above formula (2) when ring-opening copolymerization is carried out with cyclopentene.

Note that in the general formula (1) and the general formula (3), n ranges from 0 to 2. Further, in each polycyclic olefin compound expressed by the above general formula (1), the number of carbon atoms of the polycyclic olefin compound is favorably 7 to 20, and more favorably 7 to 17, from the viewpoint of cost and handleability.

The content of structural units derived from a polycyclic olefin compound in a cyclopentene ring-opening copolymer of the present embodiment with respect to all repeating units is favorably greater than or equal to 0.01 mol %, more favorably greater than or equal to 0.05 mol %, and even more favorably greater than or equal to 0.1 mol %. Further, with respect to all repeating units, the content is favorably less than or equal to 4.0 mol %, more favorably less than or equal to 3.0 mol %, and even more favorably less than or equal to 2.6 mol %. If the content of structural units derived from a polycyclic olefin compound is too low, sufficient hot flowability may not be obtained. Meanwhile, if the content is too high, a cyclopentene ring-opening copolymer to be obtained may gelatinize, which may lead to inferior processability.

Thus, in the present embodiment, a cyclopentene ring-opening copolymer has a structure in which four cyclopentene ring-opening polymer chains are linked via a branch-structural unit, and at least part of cyclopentene ring-opening polymer chains is terminally modified; therefore, a cyclopentene ring-opening copolymer excellent in hot flowability can be obtained while maintaining the low heat buildup of a crosslinked rubber.

A cyclopentene ring-opening copolymer of the present embodiment may contain repeating units derived from another monomer that is polymerizable with cyclopentene and a polycyclic olefin compound described above as long as the characteristics as a cyclopentene ring-opening copolymer are maintained. The proportion of repeating units derived from the other copolymerizable monomer with respect to all repeating units is favorably less than or equal to 10 mol %, more favorably less than or equal to 5 mol %, and even more favorably less than or equal to 1 mol %.

As the other monomer that is copolymerizable with cyclopentene and a polycyclic olefin compound described above, a monocyclic olefin other than cyclopentene and a polycyclic olefin compound described above, monocyclic diene, monocyclic triene, polycyclic olefin, polycyclic diene, polycyclic triene, or the like may be listed. As a monocyclic olefin other than cyclopentene and a polycyclic olefin compound described above, cyclopentene having a substituent and cyclooctene that may have a substituent may be exemplified. As a monocyclic diene, 1,5-cyclooctadiene that may have a substituent may be exemplified. As a monocyclic triene, 1,5,9-cyclododecatriene that may have a substituent may be exemplified. Also, as a polycyclic olefin, polycyclic diene, or polycyclic triene, a norbornene compound that may have a substituent such as 2-norbornene, 1,4-methano-1,4,4a,9a-tetrahydro-9H-fluorene, tetracyclo[6.2.1.1$^{3,6}$.0$^{2,7}$]dodec-4-ene, or the like may be exemplified.

The molecular weight of the cyclopentene ring-opening copolymer is, although not limited in particular, in terms of the polystyrene-converted weight average molecular weight (Mw) measured by gel permeation chromatography, favorably 100,000 to 1,000,000, more favorably 150,000 to 900,000, and even more favorably 200,000 to 800,000. A cyclopentene ring-opening copolymer having such a molecular weight enables to obtain a crosslinked rubber that has an excellent mechanical strength.

The polystyrene-converted ratio (Mw/Mn) of the weight average molecular weight (Mw) to the number average molecular weight (Mn) of a cyclopentene ring-opening copolymer measured by gel permeation chromatography is, although not limited in particular, favorably less than or equal to 4.0, more favorably less than or equal to 3.5, and even more favorably less than or equal to 3.0; and favorably greater than or equal to 1.2, and more favorably greater than or equal to 1.5. Having such Mw/Mn enables to make the mechanical properties of a crosslinked rubber further excellent.

In double bonds present in cyclopentene-derived structural units in a cyclopentene ring-opening copolymer, although the cis/trans ratio is not limited in particular, it is favorably set in a range between 10/90 to 90/10. From the viewpoint of obtaining a crosslinked rubber excellent in low-temperature characteristics, it is favorably in a range between 90/10 and 51/49, and more favorably in a range between 90/10 and 55/45. Further, from the viewpoint of obtaining a crosslinked rubber excellent in fracture strength characteristics, it is favorably in a range between 10/90 and 49/51, and more favorably in a range between 10/90 and 45/55.

Note that a method of adjusting the cis/trans ratio of a cyclopentene ring-opening copolymer is not limited in particular; for example, a method may be considered that controls the polymerization conditions when polymerizing cyclopentene to obtain a cyclopentene ring-opening copolymer. For example, a higher polymerization temperature when polymerizing cyclopentene results in a higher trans ratio, and a lower monomer concentration in the polymerization solution results in a higher trans ratio.

The glass transition temperature (Tg) of a cyclopentene ring-opening copolymer is, although not limited in particular, from the viewpoint of achieving excellent characteristics at a low temperature, favorably lower than or equal to −90° C., more favorably lower than or equal to −95° C., and even more favorably lower than or equal to −98° C.; and normally higher than or equal to −130° C. The glass transition temperature of a cyclopentene ring-opening copolymer can be adjusted, for example, by adjusting the cis/trans ratio or the like in the double bonds present in the repeating units.

<Method of Producing Cyclopentene Ring-Opening Copolymer>

A method of producing a cyclopentene ring-opening copolymer in the present embodiment is to carry out ring-opening copolymerization with cyclopentene and a polycyclic olefin compound having at least two ring structures each having one double bond, by using an olefin-based hydrocarbon containing a modifying group that modifies a terminal of a cyclopentene ring-opening polymer chain.

As a cyclopentene to be polymerized, cyclopentene that can become a cyclopentene ring-opening copolymer by ring-opening polymerization as described above can be used.

Also, as a polycyclic olefin compound copolymerized with cyclopentene, a polycyclic olefin compound having at least two ring structures each having one double bond as described above can be used.

The amount of a polycyclic olefin compound is favorably set to 0.005 to 0.95 mol %, more favorably set to 0.01 to 0.9 mol %, and even more favorably set to 0.04 to 0.8 mol % with respect to cyclopentene. If the amount of a polycyclic olefin compound used is too low, the content of structural units derived from the polycyclic olefin compound may become too low to obtain a sufficient hot flowability. On the other hand, if the amount is too high, the content of structural units derived from a polycyclic olefin compound may become too large to an extent that an obtained cyclopentene ring-opening copolymer gelatinizes, resulting in poor processability.

As an olefin-based hydrocarbon containing a modifying group that modifies terminals of cyclopentene ring-opening polymer chains, which is present in a reaction system for copolymerizing cyclopentene and a polycyclic olefin compound (may be abbreviated as a "modifying-group-containing olefin-based hydrocarbon"), an unsaturated modifying-group-containing olefinic hydrocarbon having a modifying group described above and having one olefinic olefinic carbon-carbon double bond having metathesis reactivity (may be abbreviated as a "unsaturated modifying-group-containing olefinic hydrocarbon", below) may be used. For example, in the case of introducing an oxysilyl group at a terminal of a cyclopentene ring-opening polymer chain, it may be realized by having an unsaturated oxysilyl-group-containing olefinic hydrocarbon present in the polymerization reaction system.

As examples of such an unsaturated oxysilyl-group-containing olefinic hydrocarbon, an alkoxysilane compound such as vinyl(trimethoxy)silane, vinyl(triethoxy)silane, allyl (trimethoxy)silane, allyl(methoxy) (dimethyl)silane, allyl(triethoxy)silane, allyl(ethoxy)(dimethyl)silane, styryl (trimethoxy)silane, styryl(triethoxy)silane, 2-styrylethyl (triethoxy)silane, allyl(triethoxysilylmethyl) ether, allyl (triethoxysilylmethyl)(ethyl)amine, 1,2-bis(triethoxysilyl) ethylene, 1,4-bis(trimethoxysilyl)-2-butene, 1,4-bis (triethoxysilyl)-2-butene, or 1,4-bis (trimethoxysilylmethoxy)-2-butene; an aryloxysilane compound such as vinyl(triphenoxy)silane, allyl(triphenoxy)silane, allyl(phenoxy) (dimethyl)silane, or 1,4-bis(triphenoxysilyl)-2-butene; an acyloxysilane compound such as vinyl(triacetoxy)silane, allyl(triacetoxy)silane, allyl(diacetoxy) methylsilane, allyl(acetoxy) (dimethyl)silane, or 1,4-bis(triacetoxysilyl)-2-butene; an alkylsiloxysilane compound such as allyltris(trimethylsiloxy)silane, or 1,4-bis [tris(trimethylsiloxy)silyl]-2-butene; a arylsiloxysilane compound such as allyltris(triphenylsiloxy)silane, or 1,4-bis [tris(triphenylsiloxy)silyl]-2-butene; a polysiloxane compound such as 1-allyl heptamethyltrisiloxane, 1-allylnonamethyl tetrasiloxane, 1-allylnonamethyl cyclopentasiloxane, 1-allyl undecamethyl cyclohexasiloxane, 1,4-bis(heptamethyltrisiloxy)-2-butene, or 1,4-bis(undecamethylcyclohexasiloxy)-2-butene; or the like may be listed.

The amount of an unsaturated modifying-group-containing olefinic hydrocarbon such as an unsaturated oxysilyl-group-containing olefinic hydrocarbon may be selected appropriately depending on the molecular weight of a cyclopentene ring-opening copolymer to be produced; in terms of the molar ratio to cyclopentene used for copolymerization, the amount is in a range of favorably 1/100 to 1/100,000, more favorably 1/200 to 1/50,000, and even more favorably 1/500 to 1/10,000. Note that an unsaturated modifying-group-containing olefinic hydrocarbon acts as a molecular weight modifier, in addition to the effect of introducing a modifying group to a terminal of a cyclopentene ring-opening polymer chain.

Also, in a method of producing a cyclopentene ring-opening copolymer in the present embodiment, a metathesis polymerization catalyst can be used according to an ordinary method. A metathesis polymerization catalyst used in the present embodiment is, although not limited in particular, favorably a substance that contains a transition metal compound in Group 6 in the periodic table as the main catalyst, and an organometallic compound as a co-catalyst.

As a transition metal compound in Group 6 in the periodic table as the main catalyst, although not limited in particular, a halide, alcoholate, arylate, oxy compound, or the like of a transition metal atom in Group 6 in the periodic table may be listed; among these, from the viewpoint of high polymerization activity, a halide is favorable. Also, Mo or W is favorable as a transition metal atom in Group 6 in the periodic table (the long-period periodic table, the same applies below).

As specific examples of such a transition metal compound in Group 6 in the periodic table, a molybdenum compound such as molybdenum pentachloride, molybdenum oxotetrachloride, molybdenum(phenylimide)tetrachloride, or the like; a tungsten compound such as tungsten hexachloride, tungsten oxotetrachloride, tungsten(phenylimide)tetrachloride, monocatecholato tungsten tetrachloride, bis(3,5-ditertiarybutyl)catecholato tungsten dichloride, bis(2-chloroethelate) tungsten tetrachloride, tungsten oxotetraphenolate, or the like may be listed.

The amount of a transition metal compound in Group 6 in the periodic table is, in terms of the molar ratio of transition metal atoms in Group 6 to cyclopentene in a metathesis polymerization catalyst, in a range of normally 1:100 to 1:200,000, favorably 1:200 to 1:150,000, and more favorably 1:500 to 1:100,000. If the amount of a transition metal compound in Group 6 in the periodic table is too low, the polymerization reaction may not proceed sufficiently. On the other hand, if the amount is too high, removal of catalyst residues from an obtained cyclopentene ring-opening copolymer may become difficult, and various characteristics of the obtained cyclopentene ring-opening copolymer may be reduced.

As organometallic compounds as the co-catalyst, organometallic compounds of metal atoms in Groups 1, 2, 12, 13, and 14 in the periodic table having a hydrocarbon group of 1 to 20 carbon atoms may be listed. Among these, organolithium, organomagnesium, organozinc, organoaluminum, and organotin are favorable; organolithium, organotin, and organoaluminum are more favorable; and organoaluminum is particularly favorable.

As organolithium, n-butyllithium, methyllithium, phenyllithium, neopentyllithium, neophyllithium, and the like may be listed.

As organomagnesium, butylethyl magnesium, butyloctyl magnesium, dihexyl magnesium, ethyl magnesium chloride, n-butyl magnesium chloride, allyl magnesium bromide, neopentyl magnesium chloride, neophyl magnesium chloride, and the like may be listed.

As organozinc, dimethyl zinc, diethyl zinc, diphenyl zinc, and the like may be listed.

As organotin, tetramethyltin, tetra (n-butyl) tin, tetraphenyltin, and the like may be listed.

As organoaluminum, trialkylaluminum such as trimethylaluminum, triethylaluminum, and triisobutylaluminum; alkylaluminum halides such as diethylaluminum chloride, ethylaluminum sesquichloride, and ethylaluminum dichloride; and in addition, compounds expressed by the following general formula (4) may be listed.

$$(R^1)_{3-x}Al(OR^2)_x \quad (4)$$

In the above general formula (4), each of $R^1$ and $R^2$ represents a hydrocarbon group having 1 to 20 carbon atoms where x ranges $0<x<3$.

In the above general formula (4), as specific examples of $R^1$ and $R^2$, an alkyl group such as a methyl group, ethyl group, isopropyl group, n-propyl group, isobutyl group, n-butyl group, t-butyl group, n-hexyl group, or cyclohexyl group; an aryl group such as a phenyl group, 4-methylphenyl group, 2,6-dimethylphenyl group, 2,6-diisopropylphenyl group, or naphthyl group; or the like may be listed. Note that although $R^1$ and $R^2$ may be the same or may be different, in the present embodiment, regarding that a higher cis ratio can be brought in a cyclopentene ring-opening copolymer to be obtained, among $R^1$ and $R^2$, at least $R^2$ is favorably an alkyl group formed with continuously bonded four or more carbon atoms, and is particularly favorably an n-butyl group, 2-methyl-pentyl group, n-hexyl group, cyclohexyl group, n-octyl group, or n-decyl group.

Here, in the above general formula (4), x ranges $0<x<3$. In other words, in the above general formula (4), $R^1$ and $OR^2$ can take any values in ranges of $0<3-x<3$ and $0<x<3$, respectively; with respect to enabling a higher polymerization activity, and enabling a higher cis ratio in a cyclopentene ring-opening copolymer to be obtained, x ranges favorably $0.5<x<1.5$.

Such an organoaluminum compound expressed by the above general formula (4) can be synthesized, for example, by a reaction of trialkylaluminum with alcohol as expressed in the following general formula (5).

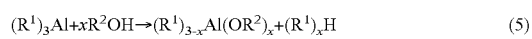

$$(R^1)_3Al + xR^2OH \rightarrow (R^1)_{3-x}Al(OR^2)_x + (R^1)_xH \quad (5)$$

Note that in the general formula (5), x can be controlled discretionarily by specifying the reaction ratio of the corresponding trialkylaluminum and alcohol as expressed in the general formula (5).

Although the amount of an organometallic compound to be used varies depending on the type of organometallic compound to be used, the amount is, in terms of the molar concentration, favorably 0.1 to 100 times, more favorably 0.2 to 50 times, and even more favorably 0.5 to 20 times the amount of transition metal atoms in Group 6 in the periodic table constituting a transition metal compound in Group 6 in the periodic table. If the amount of the organometallic compound is too low, the polymerization activity may become insufficient; or if the amount is too high, side reactions tend to occur easily during the ring-opening polymerization.

A method of producing a cyclopentene ring-opening copolymer according to the present embodiment is to carry out ring-opening copolymerization with cyclopentene and a polycyclic olefin compound, by using a modifying-group-containing olefin hydrocarbon described above, a main catalyst (transition metal compound in Group 6 in the periodic table) and a co-catalyst (organometallic compound) of a ring-opening metathesis catalyst described above.

A method of starting ring-opening copolymerization is not limited in particular. For example, ring-opening copolymerization of cyclopentene and a polycyclic olefin compound may be started, in the presence of cyclopentene, a polycyclic olefin compound described above, a modifying-group-containing olefin hydrocarbon described above, and an organometallic compound, by adding a transition metal compound in Group 6 in the periodic table. Alternatively, ring-opening copolymerization of cyclopentene and a polycyclic olefin compound described above may be carried out, by mixing in advance a transition metal compound in Group 6 in the periodic table with an organometallic compound, into which cyclopentene, a polycyclic olefin compound described above, and a modifying-group-containing olefin hydrocarbon described above are added.

In a method of producing a cyclopentene ring-opening copolymer in the present embodiment, a ring-opening copolymerization reaction may be carried out without a solvent or in a solvent. A solvent to be used when carrying out a ring-opening copolymerization reaction in a solvent simply needs to be a solvent that is inactive in the polymerization reaction, and can dissolve cyclopentene, a monomer containing a polycyclic olefin compound described above, a modifying-group-containing olefin-based hydrocarbon described above, and a metathesis polymerization catalyst described above, to be used in the ring-opening copolymerization. Such a solvent is not limited in particular; for example, a hydrocarbon solvent is favorably used. As specific examples of a hydrocarbon solvent, for example, an aromatic hydrocarbon such as benzene, toluene, xylene, or ethylbenzene; an aliphatic hydrocarbon such as n-hexane, n-heptane, or n-octane; an alicyclic hydrocarbon such as cyclohexane, cyclopentane, or methylcyclohexane; or the like may be listed.

The polymerization reaction temperature is favorably higher than or equal to −100° C., more favorably higher than or equal to −50° C., even more favorably higher than or equal to −20° C., and particularly favorably higher than or equal to 0° C. Also, the upper limit of the polymerization reaction temperature is, although not limited in particular, favorably lower than 100° C., more favorably lower than 90° C., even more favorably lower than 80° C., and particularly favorably lower than 70° C.

Also, the polymerization reaction time is favorably 1 minute to 72 hours, and more favorably 10 minutes to 20 hours.

In a method of producing a cyclopentene ring-opening copolymer in the present embodiment, a cyclopentene ring-opening copolymer can be produced by carrying out ring-opening copolymerization with cyclopentene and a polycyclic olefin compound described above, by using a transition metal compound in Group 6 in the periodic table, an organometallic compound, and a modifying-group-containing olefin-based hydrocarbon described above, and after the polymerization conversion reaches a predetermined value, adding a publicly-known polymerization terminator into the polymerization system to stop the polymerization.

Further, instead of the method using a polymerization catalyst containing a transition metal compound in Group 6 in the periodic table and an organometallic compound, by using a ruthenium carbene complex as the polymerization catalyst, a cyclopentene ring-opening copolymer may also be produced by a method of carrying out ring-opening polymerization with cyclopentene and a monomer containing a polycyclic olefin compound described above, in the presence of the ruthenium carbene complex.

Such a ruthenium carbene complex is not limited in particular as long as being capable of serving as a catalyst for ring opening polymerization of cyclopentene. As specific examples of a ruthenium carbene complex favorably used, bis(tricyclohexylphosphine)benzylidene ruthenium dichloride, bis(triphenylphosphine)-3,3-diphenylpropenylidene ruthenium dichloride, (3-phenyl-1H-indene-1-ylidene)bis(tricyclohexylphosphine)ruthenium dichloride, bis(tricyclohexylphosphine)t-butylvinylidene ruthenium dichloride, bis(1,3-diisopropylimidazolin-2-ylidene)benzylidene ruthenium dichloride, bis(1,3-dicyclohexylimidazoline)-2-ylidene)benzylidene ruthenium dichloride, (1,3-dimethytylimidazolin-2-ylidene)(tricyclohexylphosphine)benzyl ruthenium dichloride, (1,3-dimesitylimidazolidin-2-ylidene)(tricyclohexylphosphine)benzylidene ruthenium dichloride, bis(tricyclohexylphosphine) ethoxymethylidene ruthenium dichloride, (1,3-dimesitylimidazolidine-2-ylidene)(tricyclohexylphosphine)ethoxymethylidene ruthenium dichloride, and the like may be listed.

The amount of a ruthenium carbene complex to be used is, in terms of the molar ratio of metallic ruthenium in a catalyst to cyclopentene, in a range of favorably 1:2,000 to 1:2,000,000, more favorably 1:5,000 to 1:1,500,000, or even more favorably 1:10,000 to 1:1,000,000. If the amount of the ruthenium carbene complex is too low, the polymerization reaction may not proceed sufficiently. On the other hand, if the amount is too high, removal of catalyst residues from an obtained cyclopentene ring-opening copolymer may become difficult, and various characteristics of an obtained cyclopentene ring-opening copolymer may be reduced.

In the case of using a ruthenium carbene complex as the polymerization catalyst, the ring-opening polymerization reaction may be carried out without a solvent or may be carried out in a solution. As a solvent to be used when carrying out a ring-opening polymerization reaction in a solution, substantially the same solvent can be used as in the case of using a polymerization catalyst containing a transition metal compound in Group 6 in the periodic table and an organometallic compound.

Also, the polymerization reaction temperature and the polymerization reaction time in the case of using a ruthenium carbene complex as the polymerization catalyst are substantially the same as the polymerization reaction temperature and the polymerization reaction time in the case of using a polymerization catalyst containing a transition metal compound in Group 6 in the periodic table and an organometallic compound.

In a method of producing a cyclopentene ring-opening copolymer in the embodiment, in the case of using a ruthenium carbene complex as the polymerization catalyst instead of a polymerization catalyst containing a transition metal compound in Group 6 in the periodic table and an organometallic compound, a cyclopentene ring-opening copolymer can be produced by starting the ring opening copolymerization of cyclopentene and a polycyclic olefin compound described above by using the ruthenium carbene complex and a modifying-group-containing olefin-based hydrocarbon described above, and after the polymerization conversion reaches a predetermined value, by adding a publicly-known polymerization terminator to the polymerization system to stop the polymerization.

Also, in the present embodiment, if desired, an anti-aging agent such as a phenol-based stabilizer, phosphorus-base stabilizer, sulfur-base stabilizer, or the like may be added to an obtained cyclopentene ring-opening copolymer. The amount of an anti-aging agent to be added may be appropriately determined depending on the type and the like. Further, in the present embodiment, an extender oil may be compounded if desired.

Further, when carrying out a polymerization reaction, in the case of using a solvent in which the polymerization reaction is carried out, a method of obtaining the polymer from the polymer solution is not limited in particular, and a publicly-known method may be adopted. For example, a method may be adopted in which after separating the solvent by steam stripping or the like, the solid is separated by filtration, and then, dried to obtain a solid rubber.

According to a method of producing a cyclopentene ring-opening copolymer in the embodiment, in the case of using, as a polycyclic olefin compound having at least two ring structures each having one double bond, for example, norbornadiene (NBD) expressed in the upper row of (A) in the above formula (2), a ring-opening polymerization reaction occurs as expressed in the following reaction formula (6), and a cyclopentene ring-opening copolymer is obtained as expressed on the right-hand side of the following reaction formula (6).

copolymer obtained by the conventional technology (Patent Document 1), although the hot flowability may be improved, a sufficient low heat buildup may not be obtained as a crosslinked rubber.

<Rubber Composition>

A rubber composition according to the present embodiment favorably contains a rubber component containing a

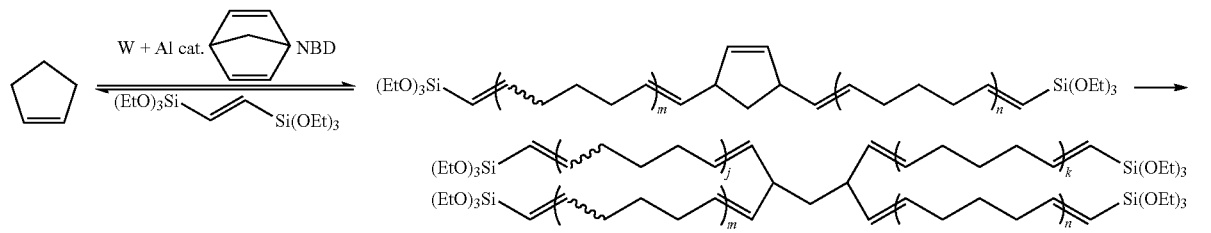

(6)

In this case, in all structures derived from norbornadiene, the content ratio of structural units in which the olefinic moieties of two rings are all ring-opening (four-branch structural units) is favorably 45 to 70%, and the content ratio of structural units in which only the olefinic moiety of a single ring is ring-opening (no-branch structural units) is favorably 55 to 30%.

A cyclopentene ring-opening copolymer obtained by a polymerization reaction of the above reaction formula (6) includes a structure in which four cyclopentene ring-opening polymer chains are linked via a branch-structural unit as described above, and all the four cyclopentene ring-opening polymer chains linked via the branch structural unit can be terminally modified, and hence, a good affinity is obtained with a filler or the like. Therefore, a cyclopentene ring-opening copolymer obtained by the above reaction formula (6) is excellent in the hot flowability, and enables to improve the low heat buildup of a crosslinked rubber to be obtained.

In contrast, a polymerization reaction expressed in the following reaction formula (7) is a polymerization reaction according to a conventional technology (Patent Document 1).

cyclopentene ring-opening copolymer and a filler. A rubber composition of the present embodiment contains a cyclopentene ring-opening copolymer as a rubber component, and as this cyclopentene ring-opening copolymer, a cyclopentene ring-opening copolymer described above can be used.

Also, as a rubber component of a rubber composition of the present embodiment, in addition to a cyclopentene ring-opening copolymer, other rubber other than the cyclopentene ring-opening copolymer may be contained. As the other rubber, for example, natural rubber, polyisoprene rubber, emulsion-polymerized styrene-butadiene copolymer rubber, solution-polymerized styrene-butadiene copolymer rubber, or polybutadiene rubber (may be a high-cis BR or low-cis BR, or may be a polybutadiene rubber containing crystal fibers formed of 1,2-polybutadiene polymer), styrene-isoprene copolymer rubber, butadiene-isoprene copolymer rubber, styrene-isoprene-butadiene copolymer rubber, ethylene-propylene diene rubber, acrylonitrile-butadiene copolymer rubber, emulsion-polymerized styrene-acrylonitrile-butadiene copolymer rubber, polyisoprene-SBR block copolymer rubber, polystyrene-polybutadiene-polystyrene block copolymer, acrylic rubber, epichlorohydrin rubber, (7)

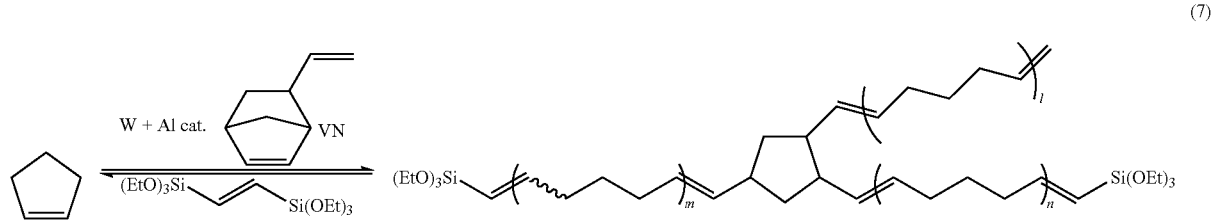

A cyclopentene ring-opening copolymer expressed on the right-hand side of the above reaction formula (7) includes a structure in which three cyclopentene ring-opening polymer chains are linked via a branch-structural unit, and among the three cyclopentene ring-opening polymer chains, only two cyclopentene ring-opening polymer chains are terminally modified, and terminals of the remaining cyclopentene ring-opening polymer chain are not modified. In such a cyclopentene ring-opening copolymer obtained by the above reaction formula (7), a portion corresponding to a vinyl group introduced as a long chain branch is not terminally modified. Therefore, in such a cyclopentene ring-opening fluororubber, silicone rubber, ethylene-propylene rubber, urethane rubber, or the like may be listed. Among these, natural rubber, polyisoprene rubber, polybutadiene rubber, solution-polymerized styrene-butadiene copolymer rubber, ethylene-propylene diene rubber, and ethylene-propylene rubber are favorable. One of the other rubbers described above may be used singly or two or more may be used in combination.

With respect to a rubber component contained in a rubber composition of the present embodiment, the content of a cyclopentene ring-opening copolymer is favorably greater than or equal to 10 wt %, more favorably greater than or equal to 20 wt %, and even more favorably greater than or equal to 30 wt %, with respect to all rubber components. On the other hand, the content of rubbers other than the cyclopentene ring-opening copolymer is favorably less than or equal to 90 wt %, more favorably less than or equal to 80 wt %, and even more favorably less than or equal to 70 wt %, with respect to all rubber components.

In a rubber composition according to an embodiment of the present invention, a filler is contained in a rubber component containing a cyclopentene ring-opening copolymer described above.

As such a filler, either of organic particles or inorganic particles can be used, for example, metal powders such as aluminum powders; inorganic powders of carbon black, hard clay, talc, calcium carbonate, titanium oxide, calcium sulfate, calcium carbonate, aluminum hydroxide, or the like; powders of organic powders such as starch or polystyrene powders; short fibers such as glass fibers (milled fibers), carbon fibers, aramid fibers, potassium titanate whiskers; silica; mica; or the like may be listed. One of these fillers may be used singly or two or more may be used in combination. Although either of organic particles or inorganic particles may be used, inorganic particles are favorable, and among these, silica and carbon black are favorable. By compounding such a filler, the mechanical strength of a crosslinked rubber to be obtained can be enhanced.

In the case of using silica as the filler, the silica to be used is not limited in particular; for example, dry-method white carbon, wet-method white carbon, colloidal silica, precipitated silica, or the like may be listed. Alternatively, a carbon-silica dual phase filler, in which silica is supported on the surface of carbon black, may be used. Among these, a wet-method white carbon containing hydrated silicate as the main component is favorable. One of these may be used singly or two or more may be used in combination.

The nitrogen adsorption specific surface area of silica is favorably 50 to 300 $m^2/g$, more favorably 80 to 220 $m^2/g$, and even more favorably 100 to 170 $m^2/g$. A nitrogen adsorption specific surface area of silica falling in this range enables to obtain a rubber composition from which a crosslinked rubber excellent in the low heat buildup is formed. Also, pH of silica is favorably less than 7, and more favorably 5 to 6.9. The nitrogen adsorption specific surface area can be measured by the BET method in accordance with ASTM D3037-81.

The compounding amount of silica is, with respect to 100 parts by weight of rubber components in a rubber composition, favorably 1 to 150 parts by weight, more favorably 10 to 120 parts by weight, even more favorably 15 to 100 parts by weight, and particularly favorably 20 to 80 parts by weight. A compounding amount of silica falling in the above range enables to obtain a rubber composition from which a crosslinked rubber excellent in the low heat buildup is formed. In either case of the compounding amount of silica being too low or too high, the low heat buildup of a crosslinked rubber obtained by crosslinking the rubber composition may be reduced.

It is favorable to further compound a silane coupling agent with a rubber composition according to the present embodiment in order to further improve the affinity between a cyclopentene ring-opening copolymer and silica. As such a silane coupling agent, for example, vinyltriethoxysilane, β-(3,4-epoxycyclohexyl)ethyltrimethoxysilane, N-(β-aminoethyl)-γ-aminopropyltrimethoxysilane, bis(3-(triethoxysilyl)propyl)tetrasulfide, or bis(3-(triethoxysilyl)propyl)disulfide; or a tetrasulfide such as γ-trimethoxysilylpropyldimethylthiocarbamyl tetrasulfide or γ-trimethoxysilylpropylbenzothiazyl tetrasulfide described in Japanese Laid-Open Patent Application No. H6-248116, may be listed. Among these, a tetrasulfide is favorable. One of these silane coupling agents may be used singly or two or more may be used in combination. The compounding amount of a silane coupling agent is, with respect to 100 parts by weight of the silica, favorably 0.1 to 30 parts by weight, and more favorably 1 to 15 parts by weight.

Also, other than components described above, a rubber composition of the present embodiment may contain compounding agents including a crosslinking agent, a crosslinking accelerator, a crosslinking activator, an anti-aging agent, a surfactant, a process oil, a plasticizer, a wax, and the like according to an ordinary method, each of which may be compounded by a necessary amount. Part of these compounding agents is exemplified below.

As a crosslinking agent, for example, sulfur; a sulfur halide, organic peroxide, quinone dioxime, organic polyhydric amine compound, zinc acrylate, alkylphenol resin having a methylol group, or the like may be listed. Among these, sulfur is favorably used. The compounding amount of a crosslinking agent is, with respect to 100 parts by weight of rubber components in a rubber composition, favorably 0.5 to 5 parts by weight, more favorably 0.7 to 4 parts by weight, and even more favorably 1 to 3 parts by weight.

As a crosslinking accelerator, for example, a sulfenamide-based crosslinking accelerator such as N-cyclohexyl-2-benzothiazolylsulfenamide, N-t-butyl-2-benzothiazolylsulfenamide, N-oxyethylene-2-benzothiazolylsulfenamide, or N,N'-diisopropyl-2-benzothiazolylsulfenamide; a guanidine-based crosslinking accelerator such as 1,3-diphenylguanidine, 1,3-diorthotolylguanidine, or 1-orthotolylbiguanidine; a thiourea-based crosslinking accelerator; a thiazole-based crosslinking accelerator; a thiuram-based crosslinking accelerator; a dithiocarbamic acid-based crosslinking accelerator; a xanthogenic acid crosslinking accelerator; or the like may be listed. Among these, an agent containing a sulfenamide crosslinking accelerator is particularly favorable. One of these crosslinking accelerators may be used singly or two or more may be used in combination. The compounding amount of a crosslinking accelerator is, with respect to 100 parts by weight of rubber components in a rubber composition, favorably 0.1 to 15 parts by weight, and more favorably 0.5 to 5 parts by weight.

As a crosslinking activator, for example, a higher fatty acid such as stearic acid, zinc oxide, or the like may be listed. The compounding amount of a crosslinking activator is not limited in particular; in the case of using a higher fatty acid as the crosslinking activator, the compounding amount is, with respect to 100 parts by weight of rubber components in a rubber composition, favorably 0.05 to 15 parts by weight, and more favorably 0.5 to 5 parts by weight; in the case of using zinc oxide as the crosslinking activator, the compounding amount is, with respect to 100 parts by weight of rubber components in a rubber composition, favorably 0.05 to 15 parts by weight, and more favorably 0.5 to 5 parts by weight. One of these crosslinking activators may be used alone or two or more may be used in combination.

As a process oil, mineral oil or synthetic oil may be used. As mineral oil, aroma oil, naphthenic oil, paraffin oil, or the like may be used.

A method of obtaining a rubber composition of the embodiment is not limited in particular; components simply need to be mixed and kneaded according to an ordinary method. For example, compounding agents such as a filler and the like excluding a crosslinking agent and a crosslinking accelerator are mixed and kneaded with a rubber component such as a cyclopentene ring-opening copolymer, and then, the mixed material is mixed with a crosslinking agent and a crosslinking accelerator to obtain a target composition. The mixing temperature of compounding agents and a rubber component excluding a crosslinking agent and a crosslinking accelerator is favorably 70 to 200° C., and more favorably 100 to 180° C. The mixing time is favorably 30 seconds to 30 minutes. The mixed material can be mixed with a crosslinking agent and a crosslinking accelerator at 100° C. or lower, or may favorably be mixed after being cooled down to 80° C. or lower.

<Crosslinked Rubber>

A crosslinked rubber according to an embodiment of the present invention is obtained by crosslinking a rubber composition of the present embodiment described above. A crosslinking method of crosslinking a rubber composition of the present embodiment is not limited in particular, and may be selected in accordance with the shape, size, and the like of a crosslinked rubber.

A rubber composition is crosslinked by heating the rubber composition. As a method of heating a rubber composition, a general method used for crosslinking a rubber may be selected appropriately from from among press heating, steam heating, oven heating, hot-air heating, and the like. In this case, a metal mold may be filled with a rubber composition and heated to carry out crosslinking simultaneously with molding, or a rubber composition molded in advance may be heated for crosslinking.

The crosslinking temperature is 120 to 200° C., and favorably 140 to 180° C.; and the crosslinking time is around 1 to 120 minutes. Further, depending on the shape, size, and the like of a crosslinked rubber, there may be a case where even when the surface is crosslinked, the inside is not sufficiently crosslinked; therefore, the material may be further heated to carry out secondary crosslinking.

A crosslinked rubber of the present embodiment obtained in this way is excellent in the low heat buildup. Taking advantage of such a characteristic, a crosslinked rubber of the present invention can be used in various applications that include, for example, materials of tire parts such as treads, carcasses, sidewalls, beads and the like in tires; materials for various industrial products such as hoses, belts, mats, anti-vibration rubber, and others; impact modifiers for resins; resin film buffers; shoe soles; rubber shoes; golf balls; toys; and the like.

<Tire>

A tire according to the present embodiment is obtained as a tire excellent in the low heat buildup, because it contains a crosslinked rubber described above. Therefore, tires according to the present embodiment can be used in applications of low-fuel-consumption tires.

EXAMPLES

In the following, the present invention will be described based on further detailed examples; note that the present invention is not limited to these examples. Note that in the following, "parts" are by weight unless otherwise specified. Also, tests and evaluations were carried out as follows.

[Molecular Weight of Cyclopentene Ring-Opening Copolymer]

A weight average molecular weight (Mw) and a molecular weight distribution (Mw/Mn) were obtained, by first obtaining a chart based on a polystyrene-converted molecular weight by gel permeation chromatography (GPC), and then, determining based on the chart. Note that specific measurement conditions for gel permeation chromatography were as follows.

Measuring instrument: HLC-8320 EcoSCE (manufactured by Tosoh Corporation)

Columns: two GMH-HR-H (manufactured by Tosoh Corporation) were connected in series.

Detector: differential refractometer RI-8020 (manufactured by Tosoh Corporation)

Eluant: tetrahydrofuran

Column temperature: 40° C.

[Proportion of Structural Units Derived from Polycyclic Olefin Compound (Copolymer Component) in Cyclopentene Ring-Opening Copolymer]

Figure 2:
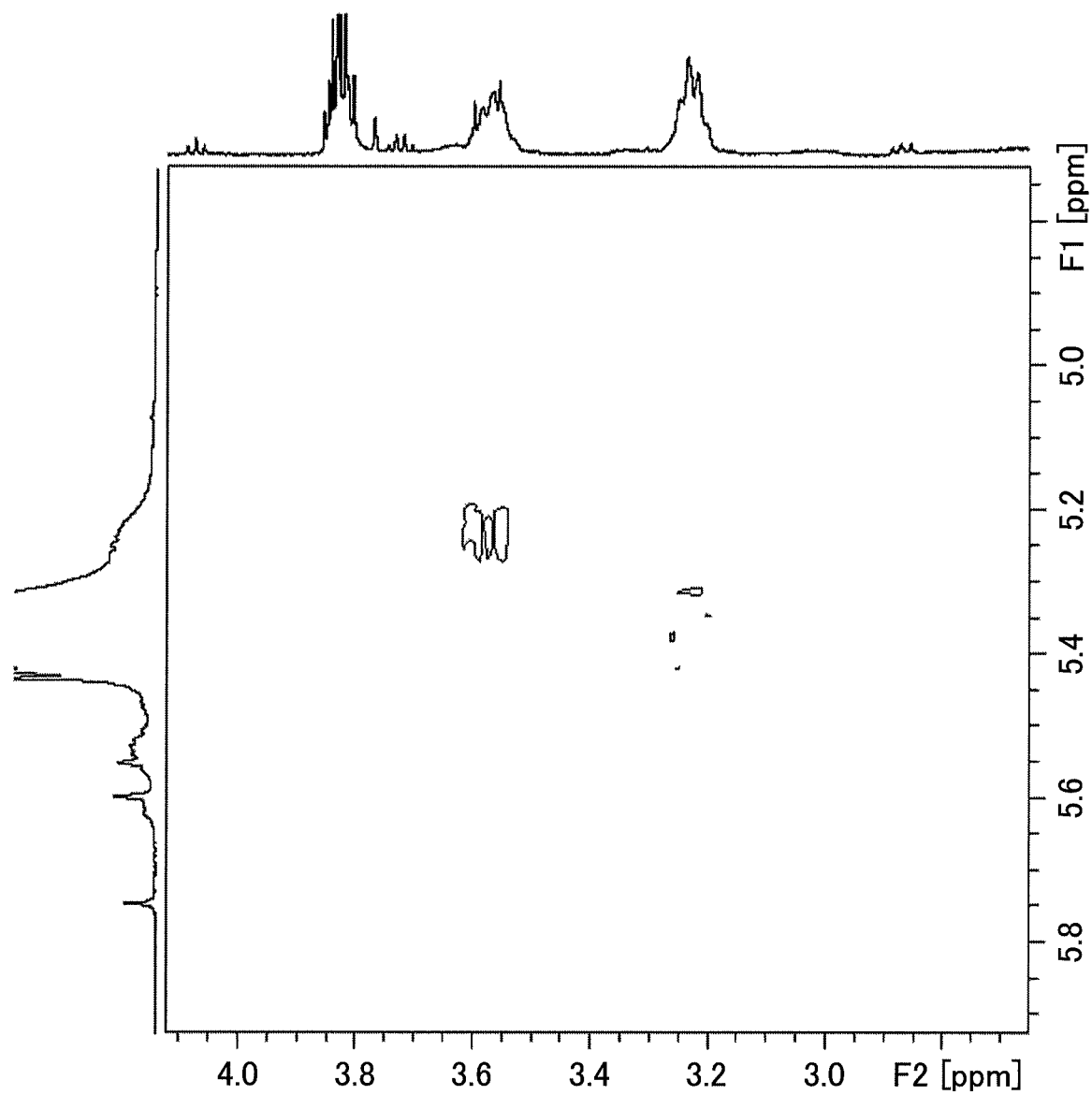
FIG. 2 is a diagram illustrating a two-dimensional NMR (H-H COSY) spectrum corresponding to FIG. 1.
Figure 3:
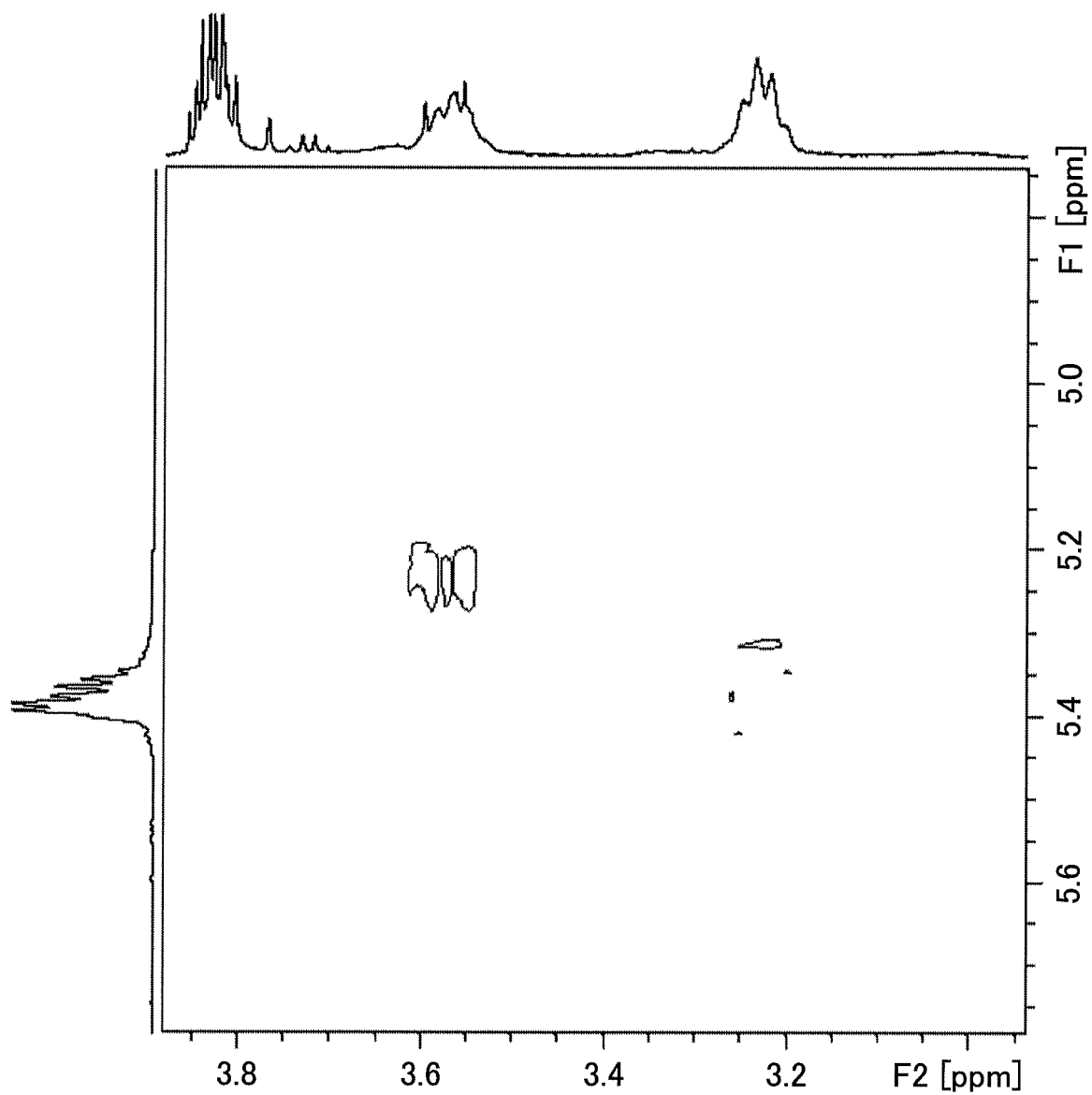
FIG. 3 is a diagram illustrating a spectrum obtained by reducing the intensity axis of one-dimensional NMR corresponding to the F1 axis in FIG. 2.

The monomer composition ratio in a cyclopentene ring-opening copolymer was obtained from $^1$H-NMR spectrometry (see FIGS. 1 to 3).

[Proportion of Cis of Cis/Trans Ratio of Cyclopentene Ring-Opening Copolymer]

The cis/trans ratio of a cyclopentene ring-opening copolymer was obtained from $^{13}$C-NMR spectrometry.

[Introduction Rate of Oxysilyl Group in Cyclopentene Ring-Opening Copolymer]

Based on $^1$H-NMR spectrometry, a ratio of a peak integral value around 3.8 ppm derived from the oxysilyl group to a peak integral value in 5.0 to 6.0 ppm derived from the carbon-carbon double bond in a cyclopentene ring-opening copolymer main chain was obtained; then, based on the ratio of the peak integral values and a measured value of the number average molecular weight (Mn) by GPC, an introduction rate of the oxysilyl group was calculated as [a percentage of (the number of terminals of cyclopentene ring-opening polymer chains introduced with the oxysilyl group/the total number of the terminals of the cyclopentene ring-opening polymer chains)].

[Glass Transition Temperature (Tg)]

A glass transition temperature (Tg) was measured by using a differential scanning calorimeter (DSC called X-DSC 7000 manufactured by Hitachi High-Tech Science Co., Ltd.) in a temperature range of −150° C. to 40° C. with a temperature rising rate of 10° C./minute.

[Hot Flowability Evaluation]

With respect to an obtained cyclopentene ring-opening copolymer, by using a viscoelasticity measuring device (product name "Rubber Process Analyzer RPA 2000", manufactured by Alpha Technologies, LLC), a storage modulus G' was measured at 108° C. under a condition of the frequency being 0.1 Hz. This value was obtained as an index relative to a measured value of a sample in Comparative Example 1 as 100. A greater value of this index indicates a better hot flowability.

[Low Heat Buildup Evaluation]

A rubber composition to be used as a sample was press-crosslinked at 160° C. for 20 minutes to prepare a crosslinked test piece, and with respect to this test piece, by using a viscoelasticity measuring device (product name "EPLEXOR", manufactured by GABO STAHL GmbH), tan 5 at 60° C. was measured under conditions of initial strain of 0.5%, dynamic strain of 1%, and at 10 Hz. This value was obtained as an index relative to a measured value of a sample in Comparative Example 1 as 100. A smaller value of the index indicates a better low heat buildup.

Preparation Example 1

<Preparation of Diisobutylaluminum Monomethoxide/Toluene Solution (2.5 wt %)>

Under a nitrogen atmosphere, 61 parts of toluene and 7.8 parts of a 25.4 wt % triisobutylaluminum/n-hexane solution (manufactured by Tosoh Finechem Corp.) were added to a glass container with a stirrer. Next, the container was cooled down to −45° C. and 0.32 parts of methanol (equimolar to triisobutylaluminum) was slowly dropped while vigorously stirring. Then, the container was left to reach room temperature while stirring, to prepare a diisobutylaluminum monomethoxide/toluene solution (2.5 wt %).

Synthesis Example 1

Under a nitrogen atmosphere, 500 parts of cyclopentene, 0.34 parts of norbornadiene (NBD), 1.42 parts of 1,2-bis(triethoxysilyl) ethylene, and 10 parts of 2.5 wt % diisobutylaluminum monomethoxide/toluene solution prepared in Preparation Example 1 were added into a pressure-resistant glass reactor equipped with a stirrer, and heated to 50° C. Then, 29 parts of a 1.0 wt % $WCl_6$/toluene solution was added, and a polymerization reaction was carried out at 50° C. for 4 hours. After the 4 hours of polymerization reaction, excess of ethyl alcohol was added into the pressure-resistant glass reactor to stop the polymerization, and then, the solution in the pressure-resistant glass reactor was poured into a large excess of ethyl alcohol containing 2,6-di-t-butyl-p-cresol (BHT). Next, the precipitated polymer was recovered, washed with ethyl alcohol and vacuum dried at 40° C. for 3 days, to obtain 210 parts of a cyclopentene/norbornadiene ring-opening copolymer. This cyclopentene/norbornadiene ring-opening copolymer was observed by $^1$H-NMR spectrometry and various two-dimensional NMR spectrometries, and turned out to have a peak around 3.50 to 3.62 ppm derived from allylic protons in the norbornadiene structural units in each of which only the olefin moiety of one ring is ring-opening. Also, a peak around 3.19 to 3.30 ppm was observed, which was derived from allylic protons in the norbornadiene structural units in each of which all the olefin moieties of the two rings are opened to form a branch structure. From these observation results, it was confirmed that the obtained polymer was a branched polymer having a branch structure derived from norbornadiene in a cyclopentene ring-opening polymer main chain. It was also confirmed that in all structures derived from norbornadiene, the content ratio of the structural unit in which all the olefin moieties of the two rings are open (a four-branch structural unit) is 53%, and the content ratio of the structural unit in which only the olefin moiety of one ring is open (no-branch structural unit) was 47% (see FIGS. 1 to 3). With respect to the obtained cyclopentene/norbornadiene ring-opening copolymer, according to the method described above, the molecular weight, the proportion of the structural unit derived from the polycyclic olefin compound (copolymer component), the cis/trans ratio, the oxysilyl group introduction rate, and the glass transition temperature (Tg) were measured. The results are shown in Table 1.

Synthesis Example 2

A polymerization reaction was carried out in substantially the same way as in Synthesis Example 1 except that the amount of norbornadiene was changed to 1.6 parts, to obtain 202 parts of a cyclopentene/norbornadiene ring-opening copolymer. With respect to the obtained cyclopentene/norbornadiene ring-opening copolymer, measurements were carried out in substantially the same way as in Synthesis Example 1. The results are shown in Table 1.

Synthesis Example 3

A polymerization reaction was carried out in substantially the same way as in Synthesis Example 1 except that the amount of norbornadiene was changed to 2.2 parts, to obtain 224 parts of a cyclopentene/norbornadiene ring-opening copolymer. With respect to the obtained cyclopentene/norbornadiene ring-opening copolymer, measurements were carried out in substantially the same way as in Synthesis Example 1. The results are shown in Table 1.

Synthesis Example 4

A polymerization reaction was carried out in substantially the same way as in Synthesis Example 1 except that the amount of norbornadiene was changed to 1.6 parts, the 2.5 wt % diisobutylaluminum monomethoxide/toluene solution was changed to 2.5 parts, and the 1.0 wt % $WCl_6$/toluene solution was changed to 7.3 parts, to obtain 31 parts of a cyclopentene/norbornadiene ring-opening copolymer. With respect to the obtained cyclopentene/norbornadiene ring-opening copolymer, measurements were carried out in substantially the same way as in Synthesis Example 1. The results are shown in Table 1.

Synthesis Example 5

A polymerization reaction was carried out in substantially the same way as in Synthesis Example 1 except that the amount of norbornadiene was changed to 2.2 parts, the 2.5 wt % diisobutylaluminum monomethoxide/toluene solution was changed to 2.5 parts, and the 1.0 wt % $WCl_6$/toluene solution was changed to 7.3 parts, to obtain 20 parts of cyclopentene/norbornadiene ring-opening copolymer. With respect to the obtained cyclopentene/norbornadiene ring-opening copolymer, measurements were carried out in substantially the same way as in Synthesis Example 1. The results are shown in Table 1.

Synthesis Example 6

A polymerization reaction was carried out in substantially the same way as in Synthesis Example 1 except that the amount of norbornadiene was changed to 3.2 parts, the 2.5 wt % diisobutylaluminum monomethoxide/toluene solution was changed to 2.5 parts, and the 1.0 wt % $WCl_6$/toluene solution was changed to 7.3 parts, to obtain 32 parts of cyclopentene/norbornadiene ring-opening copolymer. With respect to the obtained cyclopentene/norbornadiene ring-opening copolymer, measurements were carried out in substantially the same way as in Synthesis Example 1. The results are shown in Table 1.

Synthesis Example 7

A polymerization reaction was carried out in substantially the same way as in Synthesis Example 1 except that the amount of norbornadiene was changed to 3.8 parts, the 2.5 wt % diisobutylaluminum monomethoxide/toluene solution was changed to 2.5 parts, and the 1.0 wt % $WCl_6$/toluene solution was changed to 7.3 parts, to obtain 77 parts of a cyclopentene/norbornadiene ring-opening copolymer. With respect to the obtained cyclopentene/norbornadiene ring-opening copolymer, measurements were carried out in substantially the same way as in Synthesis Example 1. The results are shown in Table 1.

Synthesis Example 8

A polymerization reaction was carried out in substantially the same way as in Synthesis Example 1 except that the amount of norbornadiene was changed to 5.4 parts, the 2.5 wt % diisobutylaluminum monomethoxide/toluene solution was changed to 2.5 parts, and the 1.0 wt % $WCl_6$/toluene solution was changed to 7.3 parts, to obtain 86 parts of a cyclopentene/norbornadiene ring-opening copolymer. With respect to the obtained cyclopentene/norbornadiene ring-opening copolymer, measurements were carried out in substantially the same way as in Synthesis Example 1. The results are shown in Table 1.

Note that with respect to the cyclopentene/norbornadiene ring-opening copolymers obtained in Synthesis Examples 2 to 8 described above, it was confirmed as in Synthesis Example 1 that each of the obtained polymers was a branched polymer having a branch structure derived from norbornadiene in a cyclopentene ring-opening polymer main chain. Also, with respect to the cyclopentene/norbornadiene ring-opening copolymers obtained in Synthesis Examples 2 to 8, it was also confirmed that in all structures derived from norbornadiene, the content ratio of the structural unit in which all the olefin moieties of the two rings are open (a four-branch structural unit) was within a range of 50% to 60%, and the content ratio of the structural unit in which only the olefin moiety of one ring is open (no-branch structural unit) was within a range of 40% to 50% (see FIGS. 1 to 3).

Synthesis Example 9

A polymerization reaction was carried out in substantially the same way as in Synthesis Example 1 except that norbornadiene was not used, to obtain 166 parts of a cyclopentene ring-opening polymer. With respect to the obtained cyclopentene ring-opening copolymer, measurements were carried out in substantially the same way as in Synthesis Example 1. The results are shown in Table 1.

Synthesis Example 10

A polymerization reaction was carried out in substantially the same way as in Synthesis Example 1 except that 0.088 parts of 5-vinyl-2-norbornene (VN) was used instead of norbornadiene, to obtain 138 parts of a cyclopentene/5-vinyl-2-norbornene ring-opening ring copolymer. Measurements were carried out on the obtained cyclopentene/5-vinyl-2-norbornene ring-opening copolymer in substantially the same way as in Synthesis Example 1. The results are shown in Table 1.

Synthesis Example 11

A polymerization reaction was carried out in substantially the same way as in Synthesis Example 1 except that 0.49 parts of 5-vinyl-2-norbornene was used instead of norbornadiene, to obtain 132 parts of a cyclopentene/5-vinyl-2-norbornene ring-opening copolymer. Measurements were carried out on the obtained cyclopentene/5-vinyl-2-norbornene ring-opening copolymer in substantially the same way as in Synthesis Example 1. The results are shown in Table 1.

Synthesis Example 12

A polymerization reaction was carried out in substantially the same way as in Synthesis Example 1 except that 1.66 parts of 2-norbornene was used in place of norbornadiene, to obtain 151 parts of a cyclopentene/2-norbornene ring-opening copolymer. Measurements were carried out on the obtained cyclopentene/2-norbornene ring-opening copolymer in substantially the same way as in Synthesis Example 1. The results are shown in Table 1.

Synthesis Example 13

A polymerization reaction was carried out in substantially the same way as in Synthesis Example 1 except that 1.91 parts of 1,5-cyclooctadiene was used instead of norbornadiene, to obtain 139 parts of a cyclopentene/1,5-cyclooctadiene ring-opening copolymer. Measurements were carried out on the obtained cyclopentene/1,5-cyclooctadiene ring-opening copolymer in substantially the same way as in Synthesis Example 1. The results are shown in Table 1.

Synthesis Example 14

In an autoclave with a stirrer, under a nitrogen atmosphere, 5,670 g of cyclohexane, 170 g of styrene, 430 g of 1,3-butadiene, and 10.0 mmol of tetramethylethylenediamine were set; then, n-butyllithium was added into it by an amount necessary to neutralize impurities contained in cyclohexane, styrene, and 1,3-butadiene that would hinder polymerization. Thereafter, 5.6 mmol of n-butyllithium was added as a portion to be used for the polymerization reaction, and the polymerization was started at 40° C. Ten minutes after the start of the polymerization, 40 g of styrene and 360 g of 1,3-butadiene were continuously added over 60 minutes. The maximum temperature in the course of the polymerization reaction was 70° C. After the continuous addition had completed, the polymerization reaction was continued for another 10 minutes; then, having confirmed that the polymerization conversion reached a range of 95% to 100%, 0.278 mmol of tin tetrachloride as a coupling agent was added in a state of being dissolved in a 20 wt % cyclohexane solution, to be reacted at 65° C. for 10 minutes. Next, 0.024 mmol of a polyorganosiloxane expressed by the following formula (8) as a modifier was added in a state of being dissolved in a 40 wt % xylene solution, to be reacted at 65° C. for 20 minutes.

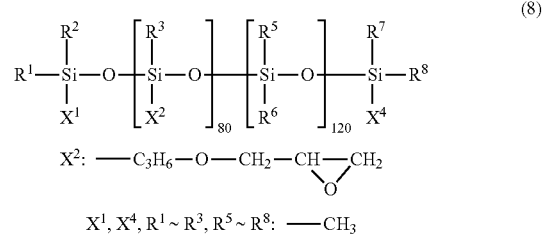

(8)

Thereafter, as a polymerization terminator, methanol was added by an amount corresponding to twice the molar equivalent of n-butyllithium used in the polymerization reaction, to obtain a solution containing modified styrene butadiene rubber. As an anti-aging agent, 0.2 parts of 2,4-bis(n-octylthiomethyl)-6-methylphenol was added per 100 parts of the rubber component of the solution containing this modified styrene butadiene rubber. Next, the solvent was removed by steam stripping to recover the solid rubber, which was then dehydrated on a roll, and dried with a hot-air drier to obtain a modified solution-polymerized styrene-butadiene rubber. The modified solution-polymerized styrene-butadiene rubber obtained as such contained 21 wt % of bonded styrene and 63 wt % of a content of vinyl bonds with respect to butadiene unit portions, had a Mooney viscosity ($ML_{1+4}$,100° C.) of 62 and a glass transition temperature (Tg) of −25° C.

Example 1

Hot flowability was evaluated for the cyclopentene ring-opening copolymer obtained in Synthesis Example 1 according to the method described above. Further, 30 parts of the cyclopentene ring-opening copolymer obtained in Synthesis Example 1 and 70 parts of the modified solution-polymerized styrene butadiene rubber obtained in Synthesis Example 14 were masticated with a Banbury mixer having a volume of 250 ml.

Next, 50 parts of silica (product name "Zeosil 1165MP", manufactured by Solvay, "ZEOSIL" is a registered trademark, nitrogen adsorption specific surface area (BET method): 163 $m^2$/g); 25 parts of process oil (product name "Aromax T-DAE", manufactured by Shin Nippon Oil Co., Ltd., "Aromax" is a registered trademark); and 4.1 parts of a silane coupling agent (bis(3-(triethoxysilyl) propyl)tetrasulfide, product name "Si69", manufactured by Degussa, "Si69" is a registered trademark) were added to be mixed and kneaded for 1.5 minutes with a starting temperature at 110° C. Next, 25 parts of silica (product name "Zeosil 1165MP", manufactured by Solvay); 3 parts of zinc oxide (zinc flower No. 1); 2 parts of stearic acid (product name "SA-300", manufactured by Adeka corporation); and 2 parts of an anti-aging agent (N-phenyl-N'-(1,3-dimethylbutyl)-p-phenylenediamine, product name "NOCLAK 6C", manufactured by Ouchi Shinko Chemical Industrial Co., LTD., "NOCLAC" is a registered trademark) were added to be mixed and kneaded for 3 minutes, and the kneaded material was discharged from the Banbury mixer. When the kneading was completed, the temperature of the rubber composition was at 150° C. Then, the obtained kneaded material was cooled down to room temperature, then, mixed and kneaded again in the Banbury mixer for 3 minutes, and then, the kneaded material was discharged from the Banbury mixer. Next, by using an open roll mixer at 50° C., the obtained kneaded material; 1.4 parts of sulfur; 2.6 parts of a mixture of 1.2 parts of a crosslinking accelerator (Cyclohexyl-2-benzothiazolylsulfenamide, manufactured by Ouchi Shinko Chemical Co., Ltd., product name "Nocceler-CZ-G") and 1.4 parts of 1,3-diphenylguanidine (product name "Nocceler D", manufactured by Ouchi Shinko Chemical Co., Ltd., "Nocceler" is a registered trademark) were mixed and kneaded, and then, a sheet-like rubber composition was taken out. Then, low heat buildup was evaluated for the obtained rubber composition according to the method described above. The results are shown in Table 1.

Example 2

Hot flowability was evaluated for the cyclopentene ring-opening copolymer obtained in Synthesis Example 2 according to the method described above. Also, a sheet-like rubber composition was obtained in substantially the same way as in Example 1, except that 30 parts of the cyclopentene ring-opening copolymer obtained in Synthesis Example 2 was used instead of the cyclopentene ring-opening copolymer obtained in Synthesis Example 1. Low heat buildup was evaluated for the obtained rubber composition according to the method described above. The results are shown in Table 1.

Example 3

Hot flowability was evaluated for the cyclopentene ring-opening copolymer obtained in Synthesis Example 3 according to the method described above. Also, a sheet-like rubber composition was obtained in substantially the same way as in Example 1, except that 30 parts of the cyclopentene ring-opening copolymer obtained in Synthesis Example 3 was used instead of the cyclopentene ring-opening copolymer obtained in Synthesis Example 1. Low heat buildup was evaluated for the obtained rubber composition according to the method described above. The results are shown in Table 1.

Example 4

Hot flowability was evaluated for the cyclopentene ring-opening copolymer obtained in Synthesis Example 4 according to the method described above. Also, a sheet-like rubber composition was obtained in substantially the same way as in Example 1, except that 30 parts of the cyclopentene ring-opening copolymer obtained in Synthesis Example 4 was used instead of the cyclopentene ring-opening copolymer obtained in Synthesis Example 1. Low heat buildup was evaluated for the obtained rubber composition according to the method described above. The results are shown in Table 1.

Example 5

Hot flowability was evaluated for the cyclopentene ring-opening copolymer obtained in Synthesis Example 5 according to the method described above. Also, a sheet-like rubber composition was obtained in substantially the same way as in Example 1, except that 30 parts of the cyclopentene ring-opening copolymer obtained in Synthesis Example 5 was used instead of the cyclopentene ring-opening copolymer obtained in Synthesis Example 1. Low heat buildup was evaluated for the obtained rubber composition according to the method described above. The results are shown in Table 1.

Example 6

Hot flowability was evaluated for the cyclopentene ring-opening copolymer obtained in Synthesis Example 6 according to the method described above. Also, a sheet-like rubber composition was obtained in substantially the same way as in Example 1, except that 30 parts of the cyclopentene ring-opening copolymer obtained in Synthesis Example 6 was used instead of the cyclopentene ring-opening copolymer obtained in Synthesis Example 1. Low heat buildup was evaluated for the obtained rubber composition according to the method described above. The results are shown in Table 1.

Example 7

Hot flowability was evaluated for the cyclopentene ring-opening copolymer obtained in Synthesis Example 7 according to the method described above. Also, a sheet-like rubber composition was obtained in substantially the same way as in Example 1, except that 30 parts of the cyclopentene ring-opening copolymer obtained in Synthesis Example 7 was used instead of the cyclopentene ring-opening copolymer obtained in Synthesis Example 1. Low heat buildup was evaluated for the obtained rubber composition according to the method described above. The results are shown in Table 1.

Example 8

Hot flowability was evaluated for the cyclopentene ring-opening copolymer obtained in Synthesis Example 8 according to the method described above. Also, a sheet-like rubber composition was obtained in substantially the same way as in Example 1, except that 30 parts of the cyclopentene ring-opening copolymer obtained in Synthesis Example 8 was used instead of the cyclopentene ring-opening copolymer obtained in Synthesis Example 1. Low heat buildup was evaluated for the obtained rubber composition according to the method described above. The results are shown in Table 1.

Comparative Example 1

Hot flowability was evaluated for the cyclopentene ring-opening copolymer obtained in Synthesis Example 9 according to the method described above. Also, a sheet-like rubber composition was obtained in substantially the same way as in Example 1, except that 30 parts of the cyclopentene ring-opening copolymer obtained in Synthesis Example 9 was used instead of the cyclopentene ring-opening copolymer obtained in Synthesis Example 1. Low heat buildup was evaluated for the obtained rubber composition according to the method described above. The results are shown in Table 1.

Comparative Example 2

Hot flowability was evaluated for the cyclopentene ring-opening copolymer obtained in Synthesis Example 10 according to the method described above. Also, a sheet-like rubber composition was obtained in substantially the same way as in Example 1, except that 30 parts of the cyclopentene ring-opening copolymer obtained in Synthesis Example 10 was used instead of the cyclopentene ring-opening copolymer obtained in Synthesis Example 1. Low heat buildup was evaluated for the obtained rubber composition according to the method described above. The results are shown in Table 1.

Comparative Example 3

Hot flowability was evaluated for the cyclopentene ring-opening copolymer obtained in Synthesis Example 11 according to the method described above. Also, a sheet-like rubber composition was obtained in substantially the same way as in Example 1, except that 30 parts of the cyclopentene ring-opening copolymer obtained in Synthesis Example 11 was used instead of the cyclopentene ring-opening copolymer obtained in Synthesis Example 1. Low heat buildup was evaluated for the obtained rubber composition according to the method described above. The results are shown in Table 1.

Comparative Example 4

Hot flowability was evaluated for the cyclopentene ring-opening copolymer obtained in Synthesis Example 12 according to the method described above. Also, a sheet-like rubber composition was obtained in substantially the same way as in Example 1, except that 30 parts of the cyclopentene ring-opening copolymer obtained in Synthesis Example 12 was used instead of the cyclopentene ring-opening copolymer obtained in Synthesis Example 1. Low heat buildup was evaluated for the obtained rubber composition according to the method described above. The results are shown in Table 1.

Comparative Example 5

Hot flowability was evaluated for the cyclopentene ring-opening copolymer obtained in Synthesis Example 13 according to the method described above. Also, a sheet-like rubber composition was obtained in substantially the same way as in Example 1, except that 30 parts of the cyclopentene ring-opening copolymer obtained in Synthesis Example 13 was used instead of the cyclopentene ring-opening copolymer obtained in Synthesis Example 1. Low heat buildup was evaluated for the obtained rubber composition according to the method described above. The results are shown in Table 1.

TABLE 1

| | | Polycyclic olefin compound (copolymerization component) | Usage of polycyclic olefin compound w.r.t. cyclopentene (mol %) | Usage of tungsten catalyst w.r.t. cyclopentene (mol %) | Weight-average molecular weight (Mw) | Molecular weight distribution (Mw/Mn) | Ratio of structural units derived from polycyclic olefin compound (copolymerization component) (mol %) | Ratio of cis in cis/trans ratio (%) | Introduction ratio of oxysilyl group (%) | Glass transition temperature (° C.) | Hot flowability (index) | Low heat buildup (index) |
|---|---|---|---|---|---|---|---|---|---|---|---|---|
| Ex. 1 | Synthesis ex. 1 | Norbornadiene | 0.05 | 0.01 | 408000 | 1.86 | 0.14 | 44 | 94 | −103.7 | 129 | 100 |
| Ex. 2 | Synthesis ex. 2 | Norbornadiene | 0.24 | 0.01 | 434000 | 2.06 | 0.52 | 48 | 95 | −103.0 | 159 | 95 |
| Ex. 3 | Synthesis ex. 3 | Norbornadiene | 0.32 | 0.01 | 477000 | 2.26 | 0.61 | 43 | 92 | −102.1 | 259 | 96 |
| Ex. 4 | Synthesis ex. 4 | Norbornadiene | 0.24 | 0.0025 | 457000 | 1.88 | 1.05 | 58 | 97 | −103.5 | 106 | 100 |
| Ex. 5 | Synthesis ex. 5 | Norbornadiene | 0.32 | 0.0025 | 473000 | 1.90 | 1.43 | 59 | 95 | −103.9 | 124 | 99 |

TABLE 1-continued

|  |  | Polycyclic olefin compound (copolymerization component) | Usage of polycyclic olefin compound w.r.t. cyclopentene (mol %) | Usage of tungsten catalyst w.r.t. cyclopentene (mol %) | Weight-average molecular weight (Mw) | Molecular weight distribution (Mw/Mn) | Ratio of structural units derived from polycyclic olefin compound (copolymerization component) (mol %) | Ratio of cis/trans ratio (%) | Introduction ratio of oxysilyl group (%) | Glass transition temperature (° C.) | Hot flowability (index) | Low heat buildup (index) |
|---|---|---|---|---|---|---|---|---|---|---|---|---|
| Ex. 6 | Synthesis ex. 6 | Norbornadiene | 0.48 | 0.0025 | 466000 | 1.91 | 1.35 | 59 | 96 | −103.9 | 140 | 100 |
| Ex. 7 | Synthesis ex. 7 | Norbornadiene | 0.56 | 0.0025 | 507000 | 2.16 | 2.01 | 58 | 98 | −103.7 | 237 | 97 |
| Ex. 8 | Synthesis ex. 8 | Norbornadiene | 0.80 | 0.0025 | 516000 | 2.37 | 2.52 | 57 | 99 | −103.1 | 341 | 98 |
| Comp. ex. 1 | Synthesis ex. 9 | — | — | 0.01 | 414000 | 1.76 | — | 48 | 96 | −103.8 | 100 | 100 |
| Comp. ex. 2 | Synthesis ex. 10 | 5-vinyl-2-norbornene | 0.01 | 0.01 | 407000 | 1.87 | 0.03 | 52 | 77 | −103.1 | 167 | 112 |
| Comp. ex. 3 | Synthesis ex. 11 | 5-vinyl-2-norbornene | 0.055 | 0.01 | 377000 | 2.47 | 0.11 | 50 | 49 | −103.5 | 314 | 125 |
| Comp. ex. 4 | Synthesis ex. 12 | 2-norbornene | 0.24 | 0.01 | 409000 | 1.78 | 0.49 | 48 | 97 | −103.3 | 96 | 99 |
| Comp. ex. 5 | Synthesis ex. 13 | 1,5-cyclooctadiene | 0.24 | 0.01 | 392000 | 1.80 | 0.25 | 50 | 95 | −104.0 | 103 | 101 |

From Table 1, it was understood that each of the cyclopentene ring-opening copolymers obtained by ring-opening copolymerization of cyclopentene and a polycyclic olefin compound having at least two ring structures each having one double bond, by using an olefin-based hydrocarbon containing a modifying group for modifying terminals of cyclopentene ring-opening polymer chains was excellent in the hot flowability and was capable of providing a crosslinked rubber excellent in the low heat buildup (Examples 1 to 8).

On the other hand, in the case of not using a polycyclic olefin compound, or in the case of using a copolymer component other than a polycyclic olefin compound, no cyclopentene ring-opening copolymer was obtained that was excellent both in the hot flowability and in the low heat buildup of a crosslinked rubber (Comparative Examples 1 to 5).

As above, aspects of the present embodiment have been described with reference to examples. Note that the present embodiment is not limited to specific aspects or examples, and various modifications and changes can be made within the scope of the invention as described in the claims.

This international application claims priority based on Japanese Patent Application No. 2017-59937 filed on Mar. 24, 2017, the entire contents of which are incorporated herein by reference.

The invention claimed is:

1. A cyclopentene ring-opening copolymer having a branch structure, comprising:
    a structure in which at least four cyclopentene ring-opening polymer chains are linked via a branch-structural unit, wherein
        at least part of the cyclopentene ring-opening polymer chains is terminally modified,modified
        the branch-structural unit is a structural unit derived from a polycyclic olefin compound having at least two ring structures each having one double bond, and
        the structural unit derived from the polycyclic olefin compound is contained by an amount of 0.01 to 4.0 mol % with respect to all repeating units.

2. A rubber composition comprising:
    a rubber component containing the cyclopentene ring-opening copolymer as claimed in claim 1; and
    a filler.

3. A crosslinked rubber obtained by crosslinking the rubber composition as claimed in claim 2.

4. A tire comprising:
    the crosslinked rubber as claimed in claim 3.

* * * * *